(12) United States Patent
Moon et al.

(10) Patent No.: US 10,883,724 B2
(45) Date of Patent: Jan. 5, 2021

(54) ELECTRONIC TEMPERATURE SAFETY CONTROL FOR A HEATING ELEMENT

(71) Applicant: NuWave, LLC, Libertyville, IL (US)

(72) Inventors: Jung S. Moon, Long Grove, IL (US); Byung Gab Choi, Lake Villa, IL (US); James Moon, Vernon Hills, IL (US); Li Xiang Jun, Foshan (CN); Zeng Qing Ping, Shanwei (CN); Kim Jong Rok, Seoul (KR); Luo Fei, Foshan (CN)

(73) Assignee: NuWave, LLC, Vernon Hills, IL (US)

( * ) Notice: Subject to any disclaimer, the term of this patent is extended or adjusted under 35 U.S.C. 154(b) by 122 days.

(21) Appl. No.: 16/049,247

(22) Filed: Jul. 30, 2018

(65) Prior Publication Data

US 2019/0155320 A1    May 23, 2019

Related U.S. Application Data

(60) Provisional application No. 62/538,450, filed on Jul. 28, 2017.

(51) Int. Cl.
*H05B 1/02* (2006.01)
*F24C 7/08* (2006.01)
*G05B 19/042* (2006.01)
*G05D 23/24* (2006.01)

(52) U.S. Cl.
CPC ............ *F24C 7/087* (2013.01); *G05B 19/042* (2013.01); *H05B 1/0202* (2013.01); *G05D 23/24* (2013.01)

(58) Field of Classification Search
CPC ....... F24C 7/087; G05B 19/042; G05D 23/24; H05B 1/0202; H05B 1/0261; H05B 1/0263; H05B 3/0071; H05B 2213/04; H05B 1/0205
USPC ............ 219/494, 443.1, 412, 413, 510, 517, 219/446.1, 448.11
See application file for complete search history.

(56) References Cited

U.S. PATENT DOCUMENTS

| | | | | |
|---|---|---|---|---|
| 3,818,183 | A * | 6/1974 | Masson | G01K 1/024 219/497 |
| 5,422,461 | A * | 6/1995 | Weiss | G05D 23/2401 219/212 |
| 5,951,898 | A * | 9/1999 | Bailleul | A47J 37/067 219/446.1 |
| 6,057,529 | A * | 5/2000 | Kirby | H05B 3/746 219/445.1 |
| 10,165,625 | B2 * | 12/2018 | Lim | H05B 1/0266 |
| 10,278,238 | B2 * | 4/2019 | Meng | H05B 6/062 |

(Continued)

*Primary Examiner* — Mark H Paschall
(74) *Attorney, Agent, or Firm* — Bishop, Diehl & Lee, Ltd.

(57) ABSTRACT

A temperature control system for appliances, such as an electric grill, air fryer, vacuum blender, convection oven, induction cooker (e.g., wok), coffeemaker, etc. The control system comprises digital circuitry for controlling temperature of the appliance, and includes a first safety component in the circuitry for stopping the heating function at a threshold parameter, such as a maximum temperature, and a second safety component in the circuitry for stopping the heating function at a second threshold temperature if the first safety component fails at the first threshold temperature. The first and second safety components, preferably switches or fuses, are connected in series to establish a redundant safety mechanism.

3 Claims, 4 Drawing Sheets

(56) References Cited

U.S. PATENT DOCUMENTS

| | | | |
|---|---|---|---|
| 10,536,991 B2 * | 1/2020 | Novikov | H05B 1/0272 |
| 10,571,133 B1 * | 2/2020 | Smith | F24C 7/04 |

* cited by examiner

ELECTRONIC TEMPERATURE SAFETY CONTROL FOR A HEATING ELEMENT

RELATED APPLICATION

The present application claims the filing priority of U.S. Provisional Application No. 62/538,450 titled "Electronic Temperature Safety Control For A Heating Element" filed on Jul. 28, 2017 (the '450 application). The '450 application is hereby incorporated herein in its entirety.

TECHNICAL FIELD OF THE INVENTION

The present invention relates to control system circuitry for household appliances. Specifically, the invention relates to safety control circuitry which prevents overheating due to a component failure.

BACKGROUND OF THE INVENTION

It is not uncommon for manufactured electronic components to fail in use. Typically, the consequences of failure are not severe. However, with some electronic components, failure may have far more significant costs, including injury to a user. This can be particularly true where the appliance has a heating element where failure can lead to personal injury or property damage.

Practically speaking, eventually all electronic systems and/or components will fail. Most electronic components far outlast the devices into which they are installed. Accordingly, manufacturing defects might account for a majority of early component failures.

Until the invention of the present application, these and other problems in the prior art have gone either unnoticed or unsolved by those skilled in the art. The present invention provides control system circuitry which is capable of performing multiple functions with associated electronic devices/appliances without sacrificing functionality, safety or affordability.

SUMMARY OF THE INVENTION

There is disclosed herein an improved safety control system for electronic devices which avoids the disadvantages of prior systems while affording additional operating advantages.

Generally speaking, the control system is for appliances, such as an electric grill, skillet, air fryer, vacuum blender, convection oven, induction cooker (e.g., wok), coffeemaker, etc. The control system comprises digital circuitry for accurately controlling temperature operation of the appliance, including a thermostat, a first safety component in the circuitry for stopping the heating function, such as the indirect heating of air or a liquid through heating of an element (e.g., a heating coil), at a threshold parameter, such as a maximum temperature, and a second safety component in the circuitry for stopping the heating function if the first safety component fails after the threshold parameter. The first and second safety components, preferably switches or fuses, are connected in series to establish a redundant safety mechanism.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

While this invention is susceptible of embodiments in many different forms, there is shown in the attached drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Figure 1:
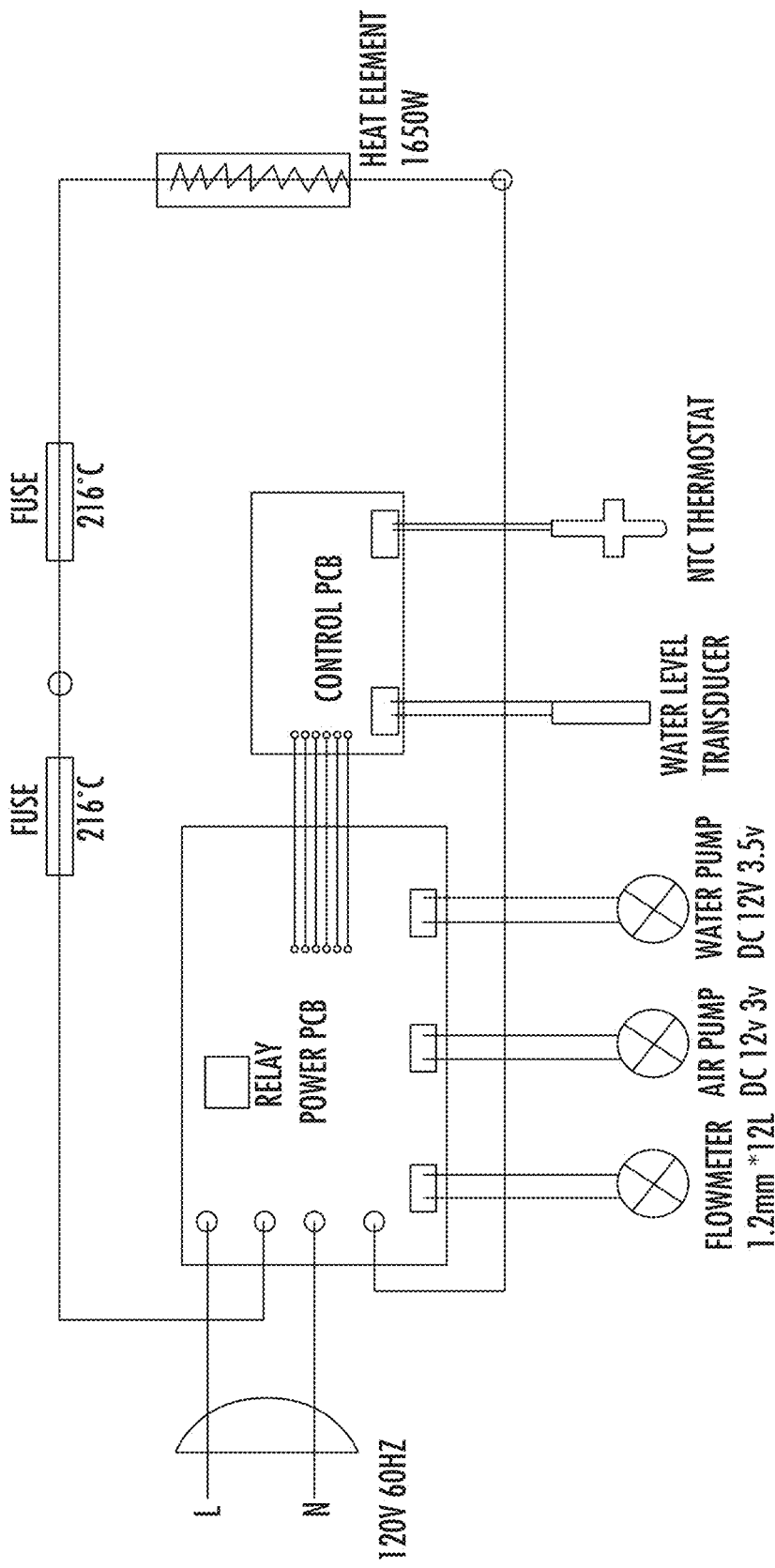
FIG. 1 is a schematic illustrating a configuration for an embodiment of the dual safety switch/fuse mechanism for a coffee maker.
Figure 2:
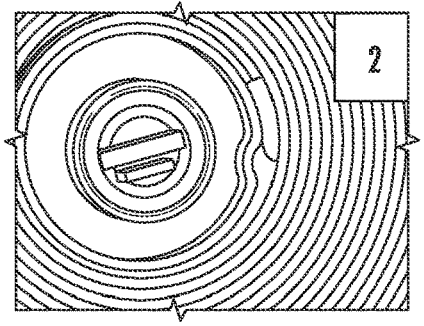
FIGS. 2 and 3 show a heating element (coil) around dual fuses used in the electronics of a cooking appliance, such as an electric wok or similar cooking surface, to prevent overheating.
Figure 3:
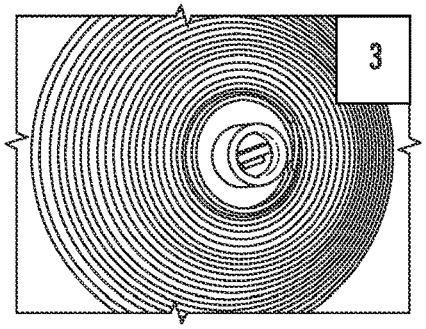
Figure 4:
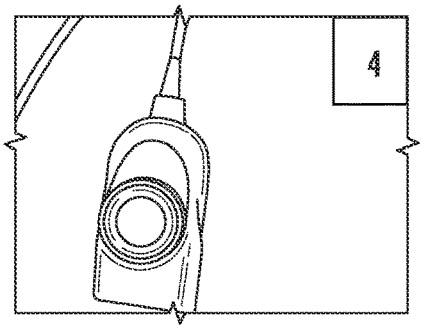
FIGS. 4-9 and 18 show prior art analog temperature controls for a heating element without any safety mechanism.
Figure 5:
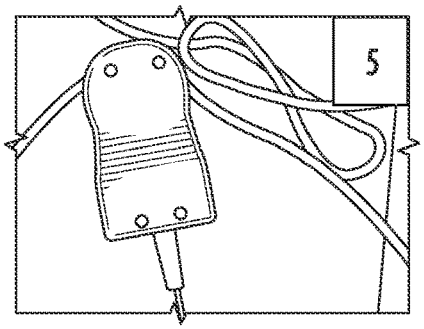
Figure 6:
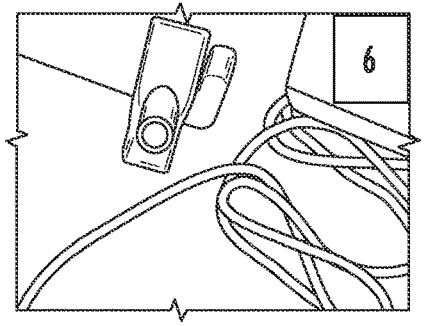
Figure 7:
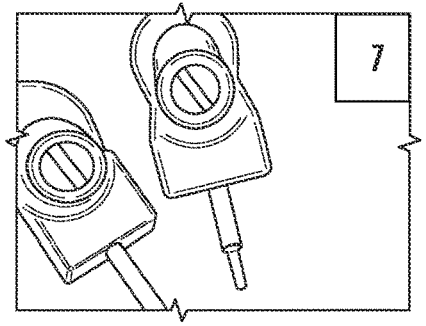
Figure 8:
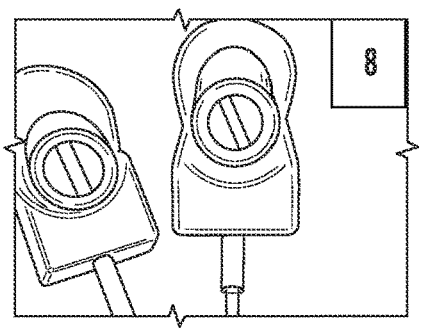
Figure 9:
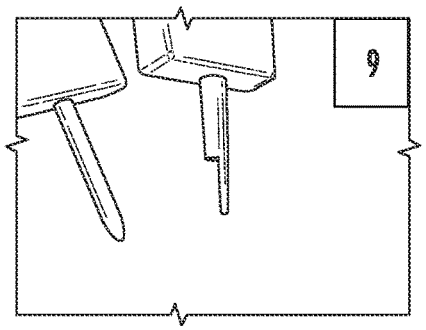
Figure 10:
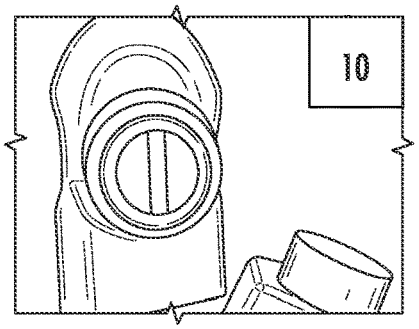
FIGS. 10-13 and 17 show a circuit board having a safety mechanism as used in a digital temperature control heating element.
Figure 11:
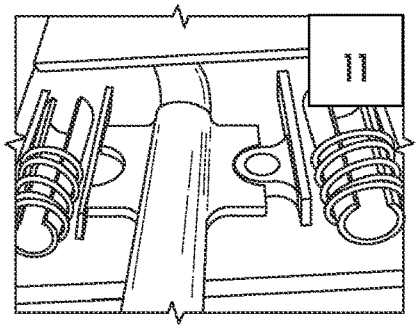
Figure 12:
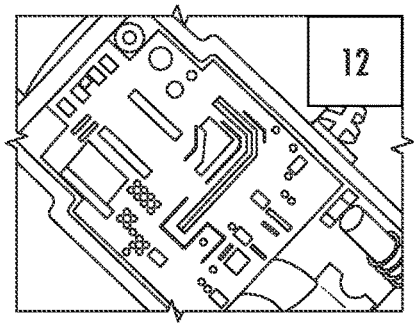
Figure 13:
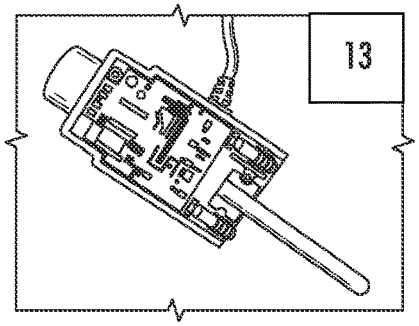
Figure 14:
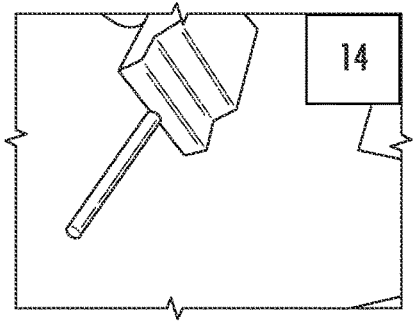
FIGS. 14-16 show an exterior of a digital temperature control, including an adjustment knob and temperature display, as used on a heating element.
Figure 15:
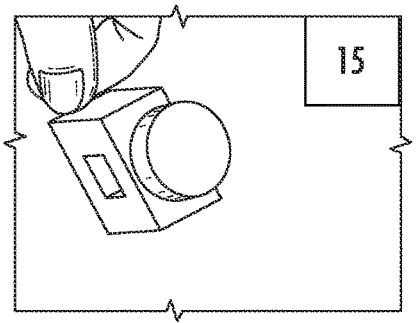
Figure 16:
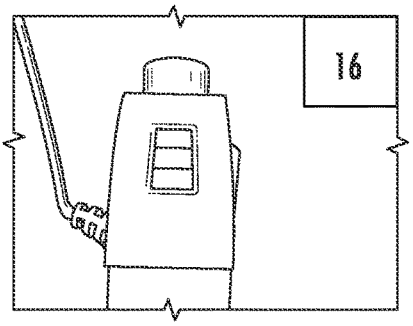
Figure 17:
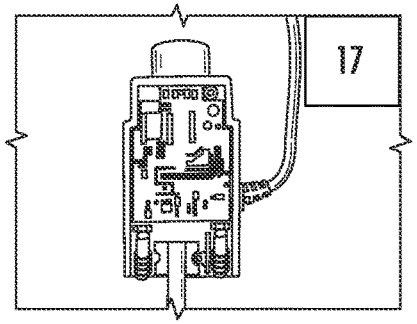
Figure 18:
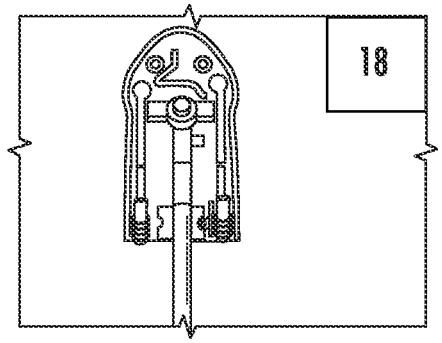
Figure 19:
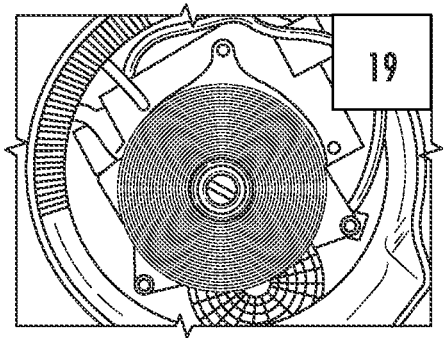
FIGS. 19-21 show dual fuses used in the electronics of a cooking appliance, such as an electric grill, to prevent overheating.
Figure 20:
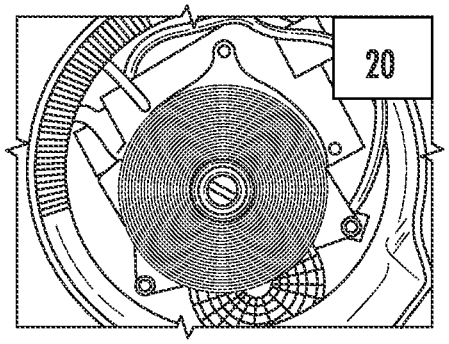
Figure 21:
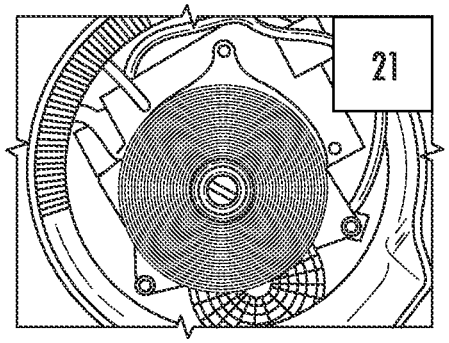

Referring to FIGS. 1-3, 10-17 and 19-21, there is illustrated temperature control circuitry. The particular illustrated circuitry is for appliances. Specifically, the control system is for operation of appliances, such as an electric grill, air fryer, vacuum blender, convection oven, induction cooker (e.g., wok), coffeemaker, etc. Most specifically, the control system comprises circuitry for controlling a temperature of the appliance, and includes a first safety component in the circuitry for stopping the heating function at a threshold parameter, such as a maximum temperature, and a second safety component in the circuitry for stopping the heating function in the event the first safety component fails before reaching the desired threshold parameter. The first and second safety components, preferably electric switches or fuses, are connected in series to establish a redundant safety mechanism.

In a preferred embodiment, a digital temperature control includes a rigid housing for encasing control circuitry, and an AC power cord and a conductive connector extending from opposing ends of the control housing. The conductive connector is a hollow component which includes three sensor wires extended into the hollow connector toward the tip. The three sensor wires lead back into the housing and attach to the circuitry therein. A first of the wires is connected to a digital negative temperature coefficient (NTC) sensor in the housing of the control. A second of the wires connects to a first safety fuse/switch, while the second wire connects to a second safety fuse/switch. Generally, the NTC has a maximum temperature of about 425° F., with an accuracy of ±5° F. However, the maximum temperature of the NTC can vary depending on the application. For purposes of this invention, the first switch is intended to shut-down power to the appliance if a sensed temperature reaches past the maximum temperature, indicating failure of the NTC sensor. By way of example only, if the maximum temperature of the NTC is configured to be about 425° F., with an accuracy of ±5° F., and the sensed temperature reaches past the set temperature of 425° F., about 430° F. (±5° F.), the first switch will automatically shut-down power to the appliance as a safety mechanism. The second switch will shut-down power if the sensed temperature continues to reach higher than the set maximum temperature, and the first switch fails to shut-down power, indicating failure of the first switch.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A temperature control system for a cooking appliance, the control system comprising:
   a housing positioned on an electric power cord which detachably connects to the cooking appliance via a connector;
   a heating element for heating a food or liquid within the cooking appliance and which couples to the power cord via the connector;
   circuitry for digitally controlling a heating function in the heating element, the circuitry being positioned within the housing;
   wherein the circuitry comprises:
      an input control for setting a desired temperature of the cooking appliance;
      a first safety component for stopping the heating function of the heating element at a first threshold temperature greater than the desired temperature; and
      a second safety component for stopping the heating function of the heating element at a second threshold temperature, wherein the first and second safety components are connected in series and the second safety component is used only when the first safety component fails to stop the heating function at the first threshold temperature.

2. The temperature control system of claim 1, wherein the heating element is for an appliance selected from one of either a convection oven, a coffeemaker, an induction wok, a skillet, a deep fryer, an air fryer, a vacuum blender, and an electric grill.

3. The temperature control system of claim 1, wherein the heating element comprises a digital NTC sensor.

* * * * *